United States Patent [19]

Scherba

[11] 4,226,684
[45] Oct. 7, 1980

[54] ELECTRODE COATING METHOD

[75] Inventor: Emil Scherba, 3100 Teranimar Dr., Anaheim, Calif. 92804

[73] Assignee: Emil Stephen Scherba, Anaheim, Calif.

[21] Appl. No.: 17,715

[22] Filed: Mar. 5, 1979

[51] Int. Cl.$^3$ .......................... C25C 1/00; C25C 7/02; H01M 4/88; H01M 4/56

[52] U.S. Cl. .............................. 204/105 R; 204/292; 252/425.3; 429/44; 429/225

[58] Field of Search ............... 427/37, 242; 219/69 V, 219/76.13, 76.14, 76.15, 76.16; 204/280, 292, 293, 105 R; 429/44, 225; 252/425.3

[56] References Cited

U.S. PATENT DOCUMENTS

| 2,709,213 | 5/1955 | Gibson | 427/37 |
|---|---|---|---|
| 2,841,687 | 7/1958 | Richter | 219/76.15 |
| 3,016,447 | 1/1962 | Gage | 427/37 |
| 3,415,970 | 12/1968 | Cline | 219/76.14 |
| 3,546,091 | 12/1970 | Rossner | 219/76.14 |
| 3,614,373 | 10/1971 | Skilling | 219/69 V |
| 4,097,711 | 6/1978 | Banerjee | 219/76.15 |

Primary Examiner—T. M. Tufariello
Attorney, Agent, or Firm—Stuart W. Knight

[57] ABSTRACT

Electrodes ultilized in electrolytic processes are coated with materials improving the electrodes by the incremental hammering of the powdered material serving as the coating on to the base electrodes by means of known processes whereunder steel is coated with more precious metals or different metals. A more satisfactory electrolytic electrode is produced by a known process. Applicant has discovered that such known processes can apply to the upgrading of electrodes used in electrolytic processes.

4 Claims, No Drawings

ELECTRODE COATING METHOD

BACKGROUND OF THE INVENTION

Various processes are known whereby certain metals may be coated with more refractory or more precious metals by techniques such as utilization of a vibrating electrode or by arc-welding techniques. Such processes are disclosed in U.S. Pat. Nos. 3,415,970; 4,097,711; 2,709,213; 3,016,447; and 2,841,687. Basically, in these prior art processes, an electric arc is created over the base or working metal to melt down a localized portion of the metal. Using a separate instrument, a gas containing the powdered coating metal is utilized to disburse the coating metal on to the molten base metal. The process involves the incremental hammering of powdered coating into a simultaneously generated minute area of a molten or semi-plastic base material. Arc-melting and concurrent hammering results from the action of the vibrating sparking electrode containing the coating powder.

While the above process is well known in the art, it has heretofore been applied only where certain metals are applied to steel, silicon carbide or other like refractory metals. To date, and to Applicant's knowledge, no one has successfully applied these processes to the coating of electrodes utilized in electrolytic processes.

Accordingly, one object of this invention is to provide a new process for coating electrodes for electrolytic processes.

Another object of the invention is to provide a new type electrode utilized in electrolytic processes.

Other objects of the invention will be apparent from the following description.

GENERAL DESCRIPTION OF THE INVENTION

Electrodes which are used in electrolytic processes generally require an electrically conductive, insoluble, non-oxidizing, corrosion-resisting surface. Suitable coatings include platinum, the platinum group metals, lead, lead alloys, magnetite, Molybdenum Disilicide, lead dioxide and other such similar metals.

Base materials or substrates which are electrically conductive and serve as the base for the electrode include titanium, tantalum, columbium, zirconium, tungsten.

The platinum group metals are excellent but are expensive. Lead and lead alloys are economical and provide satisfactory service but are slightly corrosive. Lead dioxide requires careful handling and are fragile and have low tensile strength. Magnetite electrodes have low conductivity and are fragile. Accordingly, many of the disadvantages of certain materials can be overcome by blending the materials or plating one material with another. Thus, a fabrication process which can deposit any materials or a number of uniformly mixed materials on to a corrosion-resistant, electrically conductive base would be a convenient method for utilizing the desirable properties of some coatings and at the same time accommodating the negative properties.

Accordingly, this invention contemplates the placement of certain coatings on to a base material by use of the processes as described in the aforementioned Patents, which process is known in the art. Thus, one means of depositing a satisfactory coating material on to a strong conductive substrate as a firmly adherent deposit is by the incremental hammering of a powdered coating into a concurrently generated localized area of molten or plastically deformable base material. This can be accomplished by the action of a sparking electrode containing the coating powder. Other methods may be utilized such as high pressure flame spraying or weld arc deposition but have the disadvantage that the coating material must be fused partially or completely and such coating material may decompose at a temperature below its melting point with loss of useful properties.

There should be many repetitive instantaneous individual sequences consisting of melting or near melting of minute areas of base material and followed by an immediate hammering of the coating into the plastic or molten base material. This sequence should be so rapid that chilling of base material is almost instantaneous, such that no decomposition of coating material takes place.

DETAILED DESCRIPTION

Electrode coating material is placed in a hollow tubular rod of carbon, titanium, tantalum, columbium, zirconium, tungsten or other such material. Electrode coating material may also be fed under the sparking, vibrating electrode. A vibrating electrode containing the filler material generates minute arc melted localized areas heated to a plastic state. Simultaneously, the vibrating electrode drives by impact the coating material or mixtures of coating material into the molten or plastic base material. Each sequence is of short duration such that cooling takes place instantaneously.

First an arc is formed between the base material and hollow electrode. Secondly, the hollow tube is consumed and exposes coating powder. The base material is melted locally or heated to a plastic state. Thereafter, the coated powder is hammered into the receptive base material by the vibrating action of the solid tube described above in the localized melted portion.

EXAMPLES

1. Lead dioxide was deposited by this invention onto a mechanically cleaned titanium strip which was subsequently made the anode in a 20% sulfuric acid solution with copper sulfate. Current density was 2 amp/in$^2$. Excellent plating was obtained on the cathode.

2. A mixture of Lead Dioxide and Molybdenum Disilicide powders was deposited by this invention onto a titanium substrate. This specimen was made the anode in a 20% sulfuric acid solution with copper sulfate. Excellent plating on the cathode was obtained.

3. Molybdenum Disilicide was deposited onto a titanium substrate by the process described above and was tested as above with excellent plating on the cathode. However, slight oxidization in the sulfuric acid solution reduced electrode service life.

I claim:

1. A method of coating a metal base material and using same as an electrode in electrolytic processes comprising:
    (1) Providing an arc between the base material and a hollow electrode containing the coating material;
    (2) Melting the base material locally and simultaneously hammering the coating in the form of a powder on to the local area;
    (3) Repeating said process at different localized areas on the base material until a coating is completed;
    (4) and utilizing the coated base material as an electrode in electrolytic processes.

2. The process of claim 1 wherein said coating is platinum, lead, a platinum group metal, a lead alloy, magnetite or Molybdenum Disilicide.

3. The process of claim 1 wherein said electrode is a battery electrode.

4. The process of claim 1 wherein said electrode is a fuel cell electrode.

* * * * *